F. REICHMANN.
LACE MEASURING MACHINE.
APPLICATION FILED AUG. 9, 1920.
1,415,483.
Patented May 9, 1922.
4 SHEETS—SHEET 1.
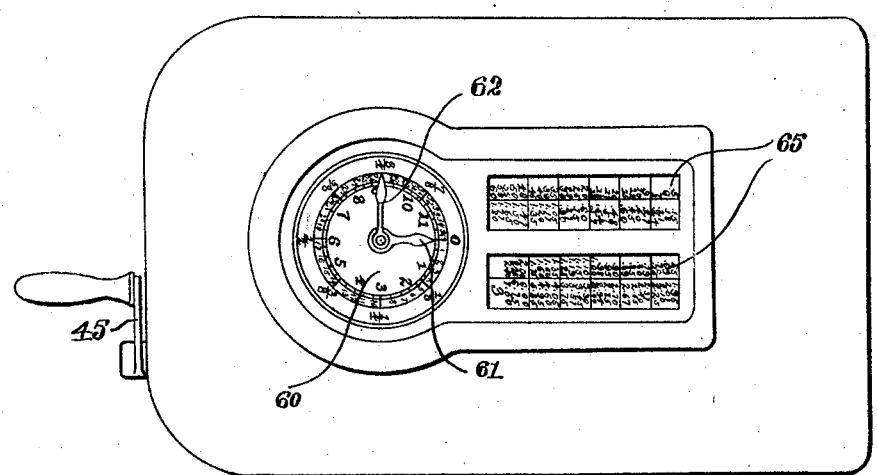
Fig. 1
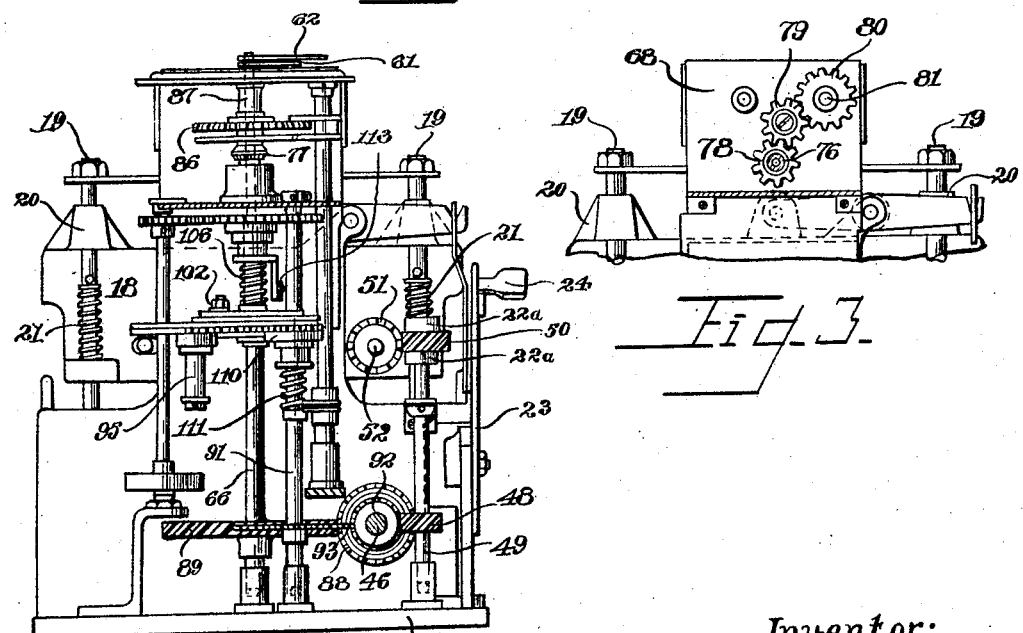
Fig. 2
Fig. 3
Inventor:
Frederick Reichmann
By Elliott & Ammen
Attys.

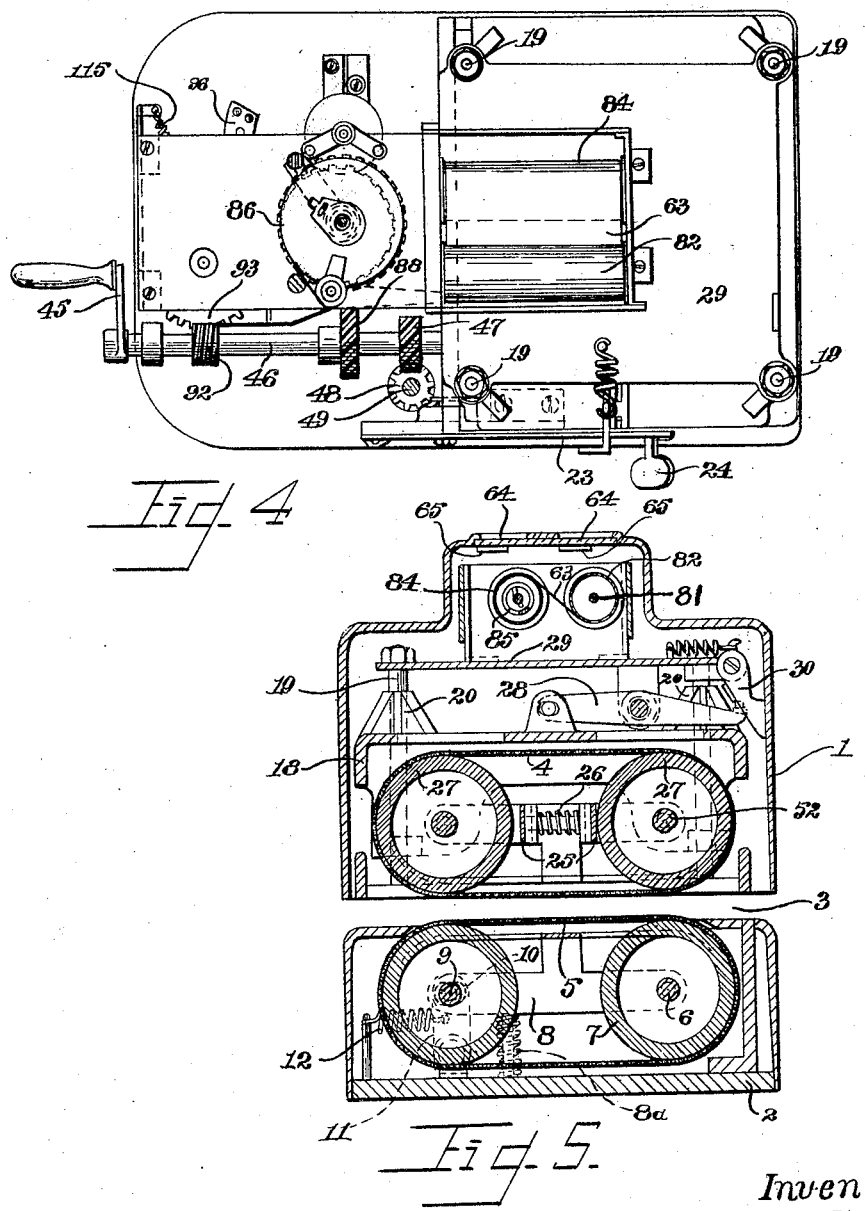

F. REICHMANN.
LACE MEASURING MACHINE.
APPLICATION FILED AUG. 9, 1920.
1,415,483.
Patented May 9, 1922.
4 SHEETS—SHEET 3.
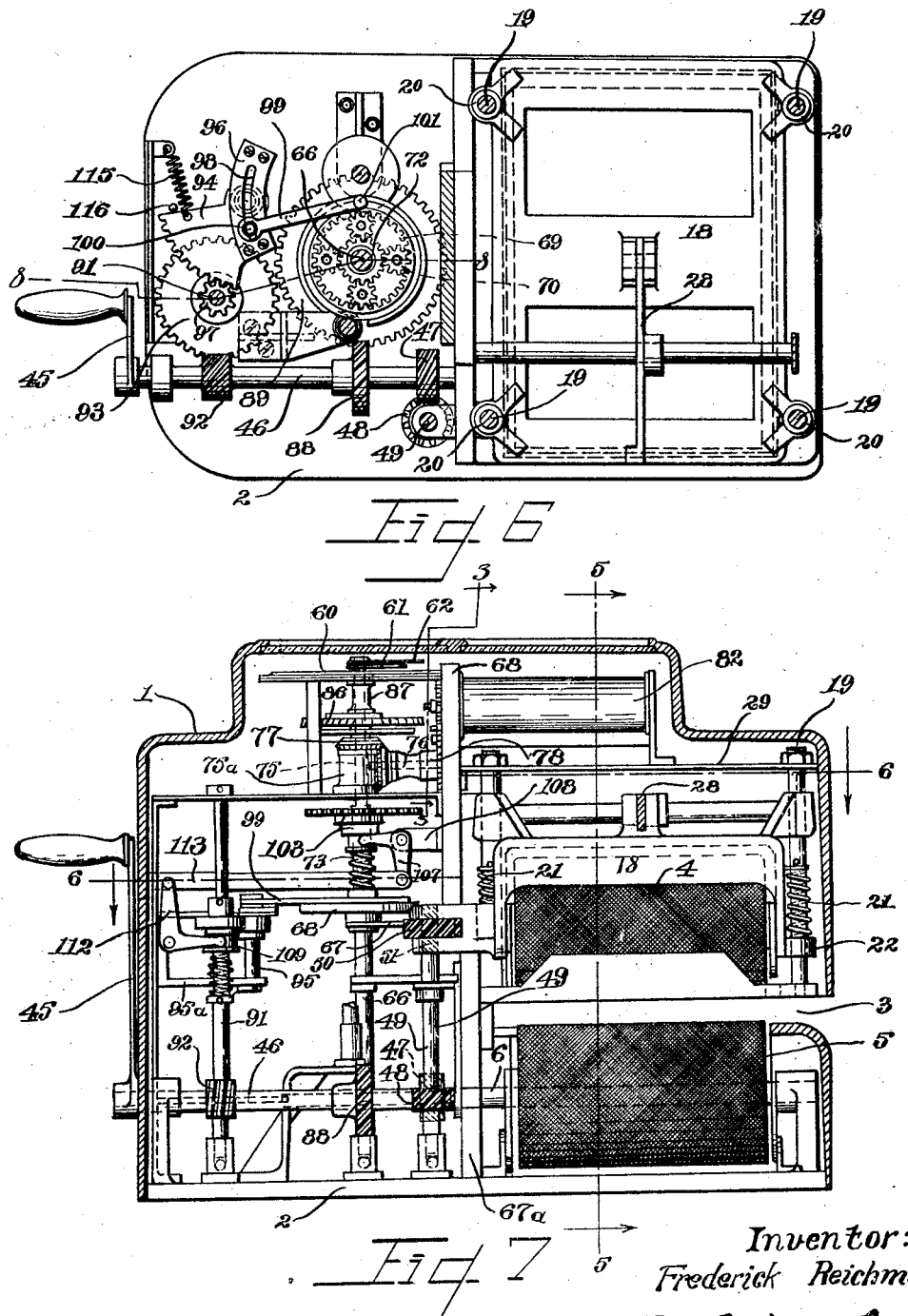

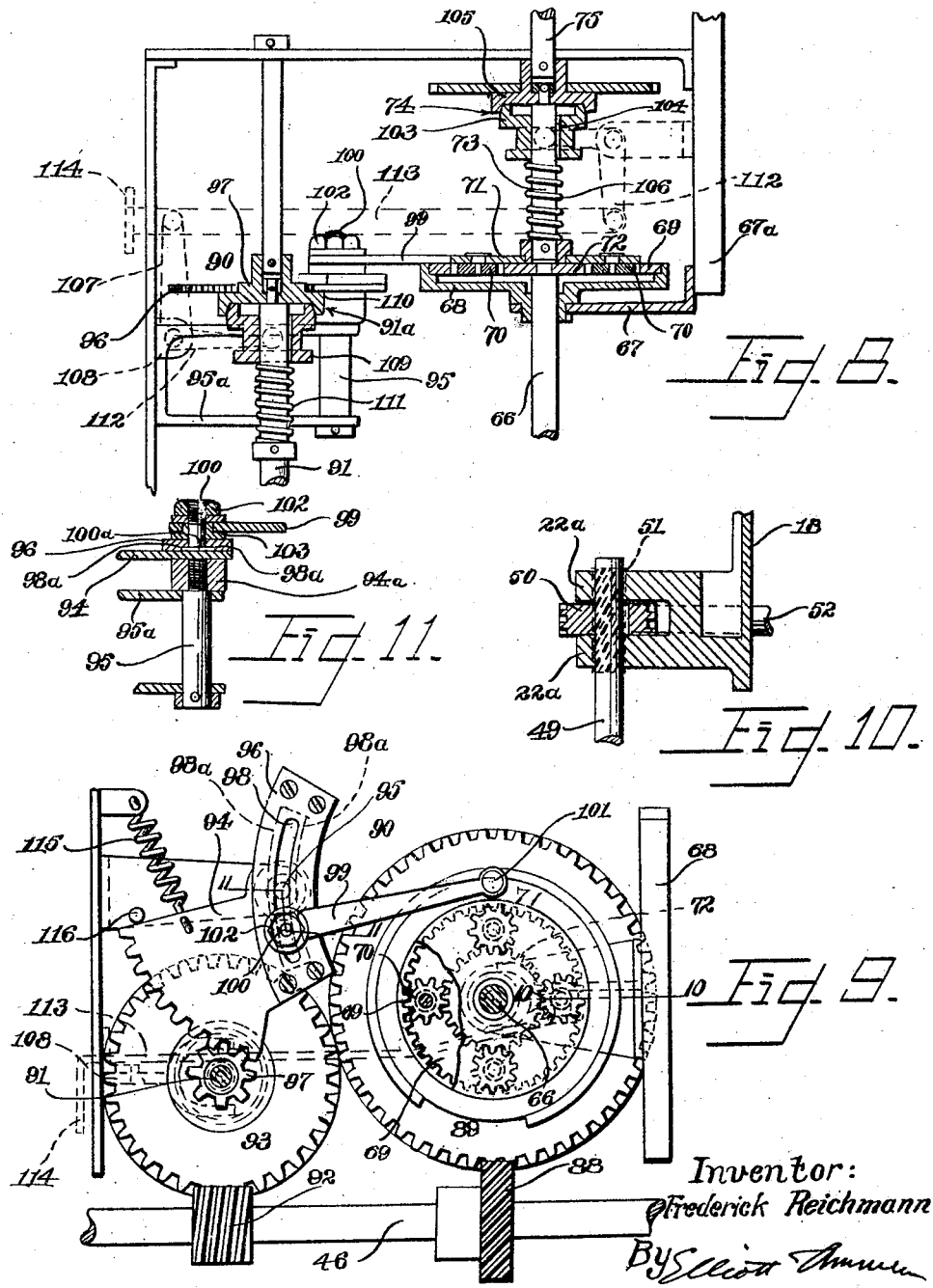

UNITED STATES PATENT OFFICE.

FREDERICK REICHMANN, OF WEBSTER GROVES, MISSOURI, ASSIGNOR TO THE MEASUREGRAPH COMPANY, OF ST. LOUIS, MISSOURI, A CORPORATION OF MISSOURI.

LACE-MEASURING MACHINE.

1,415,483.      Specification of Letters Patent.      Patented May 9, 1922.

Application filed August 9, 1920. Serial No. 402,295.

*To all whom it may concern:*

Be it known that I, FREDERICK REICHMANN, a citizen of the United States, residing in Webster Groves, St. Louis County, and State of Missouri, have invented new and useful Improvements in Lace-Measuring Machines, of which the following is a specification.

This invention relates to measuring machines for measuring fabrics, and while features of the invention are applicable to measuring machines of any kind, the invention is expected to be especially useful when applied to machines for measuring delicate fabrics, such as laces, ribbons, etc. Fabric measuring machines usually embody in their construction a measuring roller with which co-operates a presser roller and in using the machine the fabric is pulled between the two rollers, the movement of the fabric operating to rotate the measuring roller and in this way driving the indicating mechanism. While such construction is well adapted for measuring cloth or other tightly woven fabrics, it is not well adapted for measuring delicate fabrics, such as laces. A novel type of machine has been suggested for measuring laces in which the lace lies between two flexible endless belts, composed of belting, the movement being imparted to the indicating mechanism, but in order to avoid placing the lace in tension the belts are driven by a hand-actuated part; in this way, the belts operate to move the lace through the machine without placing the lace in tension. Due to the nature of the belting material there is an inherent tendency to inaccuracy of measurement in such a machine. The general object of my invention is to provide means for overcoming this difficulty and to provide means for insuring accuracy of movement of the indicating mechanism of a machine such as described above; according to my invention I provide a compensating device or mechanism as an accessory to the regular indicating mechanism, and this compensating device is capable of being adjusted to enable any inaccuracy in the indicated measurement to be corrected.

While my invention is most useful when used with a machine of the type I have described, it will be obvious that it could be used with a measuring machine having an ordinary measuring roller or presser roller, in which case great accuracy in the construction of the measuring roller would be unnecessary, because any inaccuracy in the measurement could be corrected by means of my compensating device.

Further objects of the invention will appear hereinafter.

The invention consists in the novel features, and in the general combination of parts to be particularly described hereinafter, all of which contribute to produce a simple and efficient lace measuring and cost computing machine. A preferred embodiment of my invention will be particularly described in the following specification, while the broad scope of the invention will be pointed out in the appended claims.

In the drawing,

Figure 1 is a plan of a machine embodying my invention;

Figure 2 is an end elevation of the machine looking from the left of Fig. 1 with the casing removed and showing the hand-operated driving shaft in cross section;

Figure 3 is a vertical section taken about on line 3—3 of Fig. 7 through the upper part of the machine and particularly illustrating the driving means for the indicating chart;

Figure 4 is a plan of the machine removed from the casing, certain parts being shown in cross section;

Figure 5 is a vertical section through the machine taken about on the line 5—5 of Figure 7;

Figure 6 is a horizontal section through the machine about on the broken line 6—6 of Figure 7;

Figure 7 is a longitudinal vertical section through the casing of the machine, the mechanism being shown in elevation;

Figure 8 is a vertical section taken about on line 8—8 of Fig. 6 through my compensating device and also illustrating the clutches which constitute a feature thereof;

Figure 9 is a plan of the compensating device, certain parts being broken away;

Figure 10 is a vertical section taken on line 11—11 of Fig. 9 particularly illustrating the driving connection for driving the upper belt; and Figure 11 is a vertical section taken on line 11—11 of Fig. 9 showing details of the compensating device; but in this section the parts are shown in a somewhat different relation from that shown in Fig. 9.

The machine illustrated comprises a large case 1 in the upper portion of which, parts of the indicating mechanism are visible. (See Fig. 1). This case is mounted so as to be removable to expose the mechanism of the machine which is mounted on a base plate 2. (See Fig. 2). At the right end of the machine as viewed in Figure 1, and in the lower portion of the case 1, a horizontal gap 3 is formed (see Fig. 7), and through this gap the fabric to be measured passes. Adjacent to this gap I provide a pair of oppositely disposed endless belts 4 and 5 (see Fig. 5) and I provide means for supporting these belts in such a way as to permit the adjacent runs of the belts to be driven in the same direction, that is to say, the adjacent runs of the belts may be held together so as to press the fabric between them. When the fabric is held in this way the belts are driven, and I provide indicating mechanism which is driven in unison with the belts for indicating substantially the amount of lineal movement or travel of the faces of the belts. In order to accomplish this, the belt 5 is mounted so that it is relatively fixed, that is to say, it is mounted below the gap 3 in such a way that its supporting frame has no lateral movement; the mounting of this belt comprises a fixed shaft 6 (see Fig. 5) which carries one of two rollers or belt pulleys 7, and the shaft 6 supports a frame comprising two oppositely disposed bars 8 between which a shaft 9 is carried, on which the other belt roller 7 is mounted. The ends of this shaft 9 are received in longitudinal slots 10 formed in the bars 8; a spring 8ª at each side thrusts up against its corresponding bar 8. The shaft 9 is carried on a pair of links 11 which are pivotally mounted on the base plate and these links are pulled away from the shaft 6 by means of springs 12. The purpose of the springs 12 is to maintain the belt 5 in a taut condition. The other springs prevent any lost motion in a vertical direction at the slots 10. The belts 4 and 5 are of similar construction and are simply formed of belting, leather or any other suitable flexible material.

The upper belt 4 is a relatively movable belt, that is to say, it is movable laterally so as to be held raised away from the belt 5 as indicated in Figure 5, that is, so that it can be moved toward the belt 5 in such a way that the adjacent runs of the belts come together. In order to accomplish this, the belt 4 may be mounted on a floating frame or carriage 18 (Figs. 5 and 6) which is guided to move up or down on suitable guides in the form of four posts 19, the frame 18 being provided with guide sleeves 20 which slide on these posts. Resilient means is provided tending to force this floating frame down so as to press the belt 4 resiliently against the belt 5; for this purpose the posts 19 are provided with spiral springs 21 (see Fig. 7), which thrust down upon collars or lugs 22 formed on the floating frame 18 and which slide on the posts.

The machine is provided with a knife lever 23 (see Fig. 4) carrying a knife for marking the edge of the fabric at the point where it is to be cut off, and this lever is operated by means of a thumb plate 24 which is accessible from the exterior of the casing.

The belt 4 is mounted on an extensible frame composed of two parts 25 (Fig. 5) that are forced apart by springs 26. These parts 25 carry rollers 27 over which the belt runs, and the springs operate to keep the belt taut. A lever 28 supported on a bracket depending from a cap plate 29, can be engaged by a spring-returned latch 30. (See Fig. 5). By operating this latch, lever 28 will be released, and the springs 21 Fig. 7 will then force the floating frame down so as to press the upper belt 4 against the fabric lying on the lower belt 5.

The belts may be driven by a hand lever 45, (see Fig. 4) which is carried on a shaft 46, the inner end of which carries a spiral gear 47 meshing with a spiral gear 48 on a vertical shaft 49. (See Fig. 6). The shaft 46 is an extension of the shaft 6 (see Fig. 7) so that a rotation of the shaft 46 directly rotates the shaft 6 thereby driving the belt 5. The shaft 49 is for the purpose of driving the upper belt. In the machine illustrated, one of the lugs 22 is bifurcated (see Fig. 2) the space between the two lug sections 22ª carrying a spiral gear 50 that meshes with a spiral gear 51 on the end of the shaft 52 that carries the roller 27 for the right end of the belt 4, as viewed in Figures 2, 4 and 5.

The indicating mechanism includes a dial 60 (see Fig. 1) with hands or pointers 61 and 62 for indicating yards and fractions thereof. The indicating mechanism also includes a chart 63, (Fig. 5) both sides of which are visible through windows 64 in the upper side of the casing, and these charts carry numbers which lie opposite to price numbers placed upon two scales 65. Suitable means is provided for driving this indicating mechanism in unison with the measuring belts so that it will indicate substantially the measurement of the fabric that has passed between the belts. This mechanism includes my differential device with which co-operates a compensating device that operates to correct any inaccuracy in measurement. The desirability for such a compensating means will be evident, as it will be readily understood that it would be difficult to construct the movable belts so accurately that their lineal or peripheral movement could be relied upon, to bear a fixed relation to the amount of driving movement imparted to the indicating mechanism. For this reason I provide for substantially measuring the movement or travel of the belts, but I also provide for correcting the measurement so that it is quite accurate. To do this, I provide a vertical driving shaft 66 (see Fig. 7); the upper portion of this shaft rotates in a bracket 67 (Fig. 8) which is fixed to a frame plate 67ª forming part of the frame of the machine. Fixed to this bracket 67 and concentric with the shaft 66, there is mounted a shallow cup or cupped plate 68 which carries a fixed annular gear 69 countersunk in the upper edge of the cup. This annular gear has internal teeth (Fig. 9) which mesh with planetary pinions or gears (four in number) which are rotatably mounted on the underside of a cover plate 71. These pinions 70 mesh at their outer edges with the gear 69 and at their inner edges with a gear wheel 72 rigidly carried by the shaft 66. With this construction, it is evident that when the shaft 66 is rotated, the gear 72 will rotate the pinions and cause them to rotate around on the fixed annular gear 69, thereby causing the cover plate 71 (Fig. 8) to rotate and transmit its rotary movement to a clutch shaft 73 to which this cover plate 71 is fixed. The clutch shaft 73 connects by a friction clutch 74 to a shaft 75 (see Fig. 8), and this shaft extends upwardly and drives a horizontal shaft 76 (Fig. 7) through bevel gears 77. This shaft 76 is tubular and is mounted on a fixed central arbor supported in plate 68 and on a fixed pillow block 75ª. The inner end of the shaft 76 carries a pinion 78 (see Figs. 3 and 7) that meshes with an idler 79 on the frame plate 68, and this idler drives a gear wheel 80 which is carried rigidly on the shaft 81 of a take-up roller 82 (see Fig. 5); on this take-up roller the chart 63 is wound and this chart winds off in a reversing direction from a supply roller or drum 84 which is provided with a spring 85 for maintaining the chart in tension and for winding the chart back on the roller or drum 84 after a measuring movement has occurred. The spring 85 operates therefore as a means to return the indicating mechanism to zero. The numbers on the chart 63 are on both sides of the chart and the chart is wrapped in opposite directions on the two rollers; in this way I am enabled to use a single chart although I get the effect of two charts.

In addition to driving the shaft 76, the shaft 75 operates to drive the pointers 61 and 62. The driving of these pointers is effected through suitable reduction gearing 86 (see Fig. 4) including a post 87 (Fig. 7) which carries the slow moving pointer or yard hand 61.

The shaft 66 may be driven off the shaft 46 through the medium of a spiral gear 88 which meshes with a large spiral gear 89 on the shaft 66. (See Fig. 9).

I shall now describe my compensating device 90 and its connection to the differential device for correcting any inaccuracies in measurement.

This compensating device 90 is most clearly shown in Figures 8 and 9 and it includes a vertical shaft 91 which may be driven by spiral gears 92 and 93 from the shaft 46. It also includes a pivotally mounted member 94 mounted to rock on a pivot 95. The pivotally mounted member is in the form of a segment 96, the edge of which meshes with a pinion 97 driven by the shaft 91 so that when the shaft 46 rotates, the segment will have a slow rotary movement about its pivot pin 95. This segment also includes a guide which may be in the form of an under-cut slot 98 which extends past the pivot 95, and this slot may be curved as shown. This guide or slot is employed so as to enable an adjustable connection to be formed from the segment 96 to the differential device. For this purpose I provide a connecting rod 99, one end of which is attached by means of a pin 100 in the slot 98 and the other end of which is attached by a fixed pin 101 to the cover plate 71 of the differential gear. The pin 100 may be clamped in any position in the slot by means of a nut 102. The nut seats on a washer that it clamps against the end of a bushing 103, (Fig. 11). This enables the connecting rod to swing freely on the axis of the pin, although the pin is clamped. The pin 100 has a head 100ª that fits in the rabbet grooves 98ª of the slot 98. (See Fig. 11). This pin 95 is mounted to rotate in a V shaped bracket 95ª, (Fig. 8) and is screwed into a boss 94ª secured to the segment 94.

With this construction, it will be evident that if the pin 100 is located in alignment with the axis of the pivot 95, the rotation of the segment 96 will have no effect upon the differential device and consequently will have no effect upon the reading of the indicating mechanism. But it will also be evident that if the pin 100 is located as indicated in Figure 11, it will move when the segment moves, and will impart a movement to the cover plate 71, and thereby effect through 73 a rotation of the shaft 75 which drives the indicating mechanism. It will also be evident that if the pin 100 were located in the opposite end of the slot from that where it is shown in Figure 9, a character of movement would be imparted to the differential which would be opposite to that which would be imparted if the parts are arranged as shown in Figure 9; in other words, the movable member 96 affords means for imparting a slight movement of either positive or negative character to the indicating mechanism, the degree of which will depend upon the adjustment of the pin 100 in the slot 98.

I shall now describe the means for effecting the return of the indicating mechanism to zero. In this connection it should be understood that the spiral gears 88 and 89 (Fig. 9) and the spiral gears 92 and 93 constitute locked mechanism, that is to say, the pitch of the teeth on the gears 89 and 93 is so slight that it would be impossible to rotate them, and turn the spiral gears 88 and 92 by means of the relatively small spring 85 (Fig. 5) which is placed in torsion by the winding off of the web or chart 63; for this reason I provide the clutch 74 (Fig. 8), referred to above, and for the same reason I provide a similar clutch 91ª which is associated with the shaft 91 that drives the compensating device 90.

I shall now describe these clutches more in detail. The clutch 74 comprises a sliding collar or clutch member 103 which is slidably attached by a spline or feather 104 on the shaft 73 so that the clutch member rotates with the shaft. Rigidly attached to the lower end of the shaft 75 I provide a clutch member 105. The collar or clutch member 103 is normally forced into engagement with the clutch member 105 by a coil spring 106 on the shaft 73 just above the differential gear. (See Fig. 8.) This clutch may be opened by pulling the clutch member 103 downwardly by means of a bell crank lever 107 (Fig. 7) pivotally attached on a suitable bracket 108; the clutch 91ª is similarly constructed, that is to say, it includes a splined sliding collar or clutch member 109 which is normally held against a relatively fixed clutch member 110 by means of a coil spring 111; the clutch member 110 carries the aforesaid pinion 97 which meshes with the teeth of the segment 96. This clutch 91ª may be opened at will by means of a bell crank lever 112. In order to enable both of these clutches to be opened simultaneously, the bell crank levers 107 and 112 are connected by a link 113 which terminates in a thumb plate 114 (see Fig. 8) which is accessible through an opening formed in the wall of the case.

In order to take up any back lash in the meshing of the teeth of the segment 96, I attach a small spring 115 to the segment (see Fig. 9), and this spring normally holds the back edge of the segment up against a stop 116.

I shall now describe briefly the entire mode of operation of the machine.

Supposing that the floating frame 18 is in the elevated position shown in Figure 5. The lace or other fabric to be measured would be introduced into the gap or throat 3 and held in position so that the forward edge of the fabric is about in alignment with the knife 23 (Fig. 4). The indicating mechanism having been set back to zero, the operator then pushes in on the latch 30 (Fig. 5) to release the lever 28. This permits the springs 21 (Fig. 7) to move the floating frame 18 down and press the endless belt 4 into co-operative relation with the belt 5, that is to say, they yieldingly clamp or press the lace between them. The operator then rotates the crank 45 which actuates the shaft 46, which is practically an extension of the shaft 6 of the roller 7 that carries the lower belt 5; this actuates the lower belt. The upper belt 4 is actuated through the spiral gears 47 and 48 (Fig. 7) which actuate the vertical shaft 49, the upper end of which shaft carries the splined spiral gear 50 (see Fig. 7), which meshes with the co-operating gear 51 (Fig. 2) on the shaft 52 which carries the roller 27 that drives the upper belt 4. The fact that the spiral gear 50 is splined on the vertical shaft 49, permits this raising and lowering of the floating frame 18, at the same time maintaining a driving connection to the upper belt. The rotation of the shaft 46 in driving the belts also operates to drive the indicating mechanism in unison with the belts. This is accomplished through the rotation of the shaft 66 (see Fig. 7); the shaft 66 operates through a differential device at 68 and 69 (Fig. 8) to impart movement to the shaft 73, and from that shaft through the clutch 74 to the shaft 75 which drives the indicating mechanism. The compensating device 90 is driven continuously during the measuring movement and operates to develop a slight movement in the connecting rod 99. This moves the differential device in one direction or the other proportionately with the measuring movement to effect the correction of the indicating mechanism so that it will indicate the exact length of the piece measured.

It should be understood that in order to ascertain the correct position for the pin 100, it is necessary to measure a piece of goods of a known length. When this is done a certain error may be found indicated by the indicating mechanism. The connection of the connecting rod 99 with the segment 96 is then adjusted so as to correct this error; in this way the machine may be adjusted so as to give a very accurate measurement.

After the measurement is completed the operator actuates the knife lever 23 to mark the fabric at the point where it is to be cut off.

It is understood that the embodiment of the invention described herein is only one of the many embodiments my invention may take, and I do not wish to be limited in the practice of my invention nor in my claims, to the particular embodiment set forth.

What I claim is:—

1. In a fabric measuring machine, the combination of a pair of oppositely disposed movable members constructed to receive the fabric therebetween, means for indicating substantially the amount of lineal movement of the movable members as the fabric passes therebetween, and a compensating device connected with the movable members and moving in unison continuously and proportionately therewith to prevent inaccuracies in the indicated measurement.

2. In a fabric measuring machine, the combination of a pair of oppositely disposed endless belts mounted to receive the fabric therebetween, means for driving the belts, means for indicating substantially the amount of travel of the belts as the fabric passes therebetween, and a compensating device driven in unison with the belts and proportionately therewith for correcting inaccuracies in the indicated measurement.

3. In a fabric measuring machine, the combination of a pair of oppositely disposed endless belts mounted to receive the fabric therebetween, means for driving the belts, indicating mechanism, a differential device for driving the indicating mechanism in unison with the belts to indicate substantially the amount of travel of the belts, and a compensating device actuated in unison and proportionately with the belts and connected with the differential device to correct inaccuracies in the indicated measurement.

4. In a fabric measuring machine, the combination of a pair of oppositely disposed endless belts mounted to receive the fabric therebetween, means for driving the belts, indicating mechanism, a differential device for driving the indicating mechanism in unison with the belts to indicate substantially the amount of travel of the belts, a compensating device actuated in unison and proportionately with the belts and connected with the differential device to prevent inaccuracies in the indicated measurement, and means for effecting adjustments of the compensating device to regulate the character and degree of the correction imparted thereby to the indicating mechanism.

5. In a fabric measuring machine, the combination of a pair of oppositely disposed endless belts mounted to receive the fabric therebetween, means for driving the belts, indicating mechanism, a differential device for driving the indicating mechanism in unison with the belts to indicate substantially the amount of travel of the belts, a compensating device actuated in unison with the belts and connected with the differential device to impart a less or greater movement to the indicating mechanism and thereby correct inaccuracies in the indicated measurement, and means for returning the indicating mechanism and the compensating device to their zero positions after making a measurement.

6. In a fabric measuring machine, the combination of a pair of oppositely disposed endless belts mounted to receive the fabric therebetween, indicating mechanism, a clutch, a differential device for driving the indicating mechanism through the clutch, a compensating device and clutch for driving the same, a connection from the compensating device to the differential device to correct inaccuracies of measurement, means for driving the belts, the compensating device and the differential device, means for opening the clutches, and means for returning the indicating mechanism and the compensating device to their zero positions when the clutches are open.

7. In a fabric measuring machine, the combination of a pair of oppositely disposed endless belts mounted to receive the fabric therebetween, indicating mechanism, a clutch, a differential device for driving the indicating mechanism through the clutch, a compensating device including a pivoted member, a clutch for driving the same, a connecting rod adjustably attached to the pivoted member and attached at its other end to the differential device to correct inaccuracies of measurement, means for driving the belts, the compensating device and the differential device, means for opening the clutches, and means for returning the indicating mechanism and the compensating device to their zero positions when the clutches are open.

8. In a fabric measuring machine, the combination of a pair of oppositely disposed endless belts mounted to receive the fabric therebetween, indicating mechanism, a clutch, a differential device for driving the indicating mechanism through the clutch, a compensating device including a pivoted member having a guide extending past its pivotal axis, a connecting rod having means for securing the same at different points along the guide and attached at its other end to the differential device for correcting inaccuracies of measurement, means for driving the belts, the compensating device and the differential device, means for opening the clutches, and means for returning the indicating mechanism and the compensating device to their zero positions when the clutches are open.

9. In a machine of the kind described, the combination of a measuring member mounted so as to have a peripheral movement equal to that of the fabric being measured, indicating mechanism, a differential mechanism actuated in unison with the measuring member for driving the indicating mechanism to indicate substantially the measurement of the fabric, and an adjustable compensating device connected to the differential device for correcting the indicating mechanism to a more accurate measurement.

10. In a machine of the kind described, the combination of a measuring member mounted so as to have a peripheral movement equal to that of the fabric being measured, indicating mechanism, a differential device driven in unison with the measuring member for driving the indicating mechanism, a compensating device including a pivoted member having a guide extending past the pivotal axis thereof, and a connecting rod constructed to be secured at different points on the guide and attached at its other end to the differential device so as to correct inaccuracies of measurement imparted to the indicating mechanism.

11. A measuring machine having indicating mechanism, in combination with a continuously driven adjustable compensating device for imparting a less or greater amount of movement to the indicating mechanism for correcting the indicating mechanism.

12. A measuring machine having indicating mechanism, in combination with a continuously driven differential compensating device, and means for adjusting the compensating device to impart a less or greater amount of movement to the indicating mechanism to correct the reading of the indicating mechanism.

13. In a measuring machine, the combination of indicating mechanism, a continuously driven differential compensating device through which the indicating mechanism is actuated, and means for adjusting the differential device to impart a less or greater amount of movement to the indicating mechanism to correct inaccuracy of the reading indicated by the indicating mechanism.

In testimony whereof, I have hereunto set my hand.

FREDERICK REICHMANN.